March 15, 1932. H. D. CHURCH 1,849,135
INTERNAL COMBUSTION MOTOR
Filed March 4, 1927 5 Sheets-Sheet 1

INVENTOR
HAROLD D. CHURCH
BY
Richey & Watts
ATTORNEYS

March 15, 1932. H. D. CHURCH 1,849,135
INTERNAL COMBUSTION MOTOR
Filed March 4, 1927 5 Sheets-Sheet 4

INVENTOR
HAROLD D. CHURCH
BY Richey & Watts
ATTORNEYS

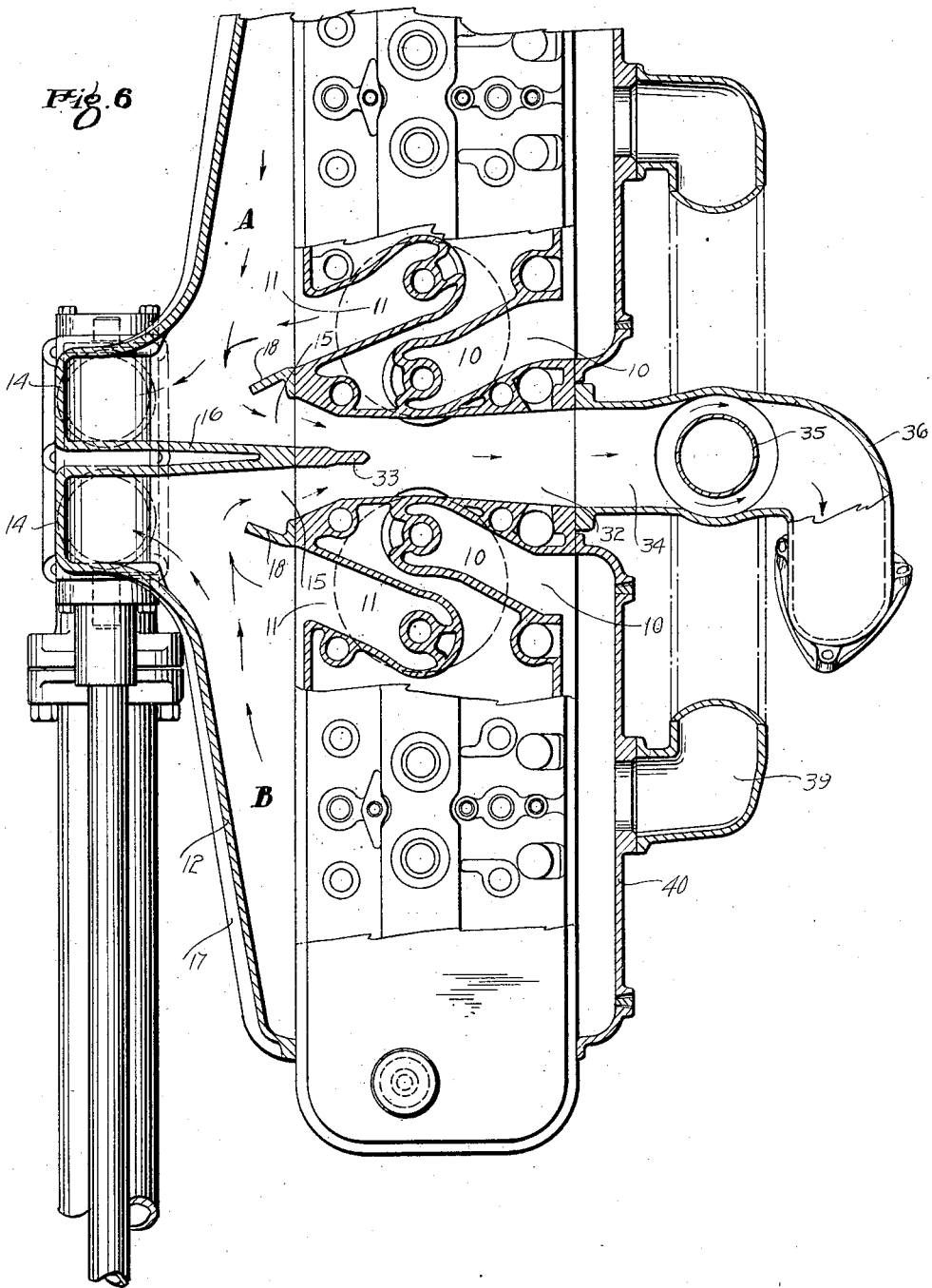

Patented Mar. 15, 1932

1,849,135

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

INTERNAL COMBUSTION MOTOR

Application filed March 4, 1927. Serial No. 172,699.

This invention relates to internal combustion motors and more particularly to the conducting of fuel and exhaust products respectively to and from the same.

One object of this invention is to provide improved means for superheating fuel as it is being supplied to the engine.

Another object is to utilize heat of the exhaust gases for heating the fuel being brought to the engine without appreciably retarding said exhaust gases in their escape.

Another object is to permit the heat of exhaust gases to be used for heating the fuel and to provide simple and efficient means for controlling the amount of heat so delivered to the fuel.

Another object is to cause the exhaust gases to be smoothly and evenly discharged from the engine without surging or pulsating thereof within the exhaust manifold.

Other objects will hereinafter appear.

The invention will be better understood from the description of one practical embodiment thereof, illustrated in the accompanying drawings, in which Fig. 1 is a plan view of the chassis of an automobile having an internal combustion motor provided with fuel and exhaust apparatus embodying the invention;

Fig. 6 is an enlarged plan view, partly in section, taken on the line 6—6 of Fig. 4; and Fig. 7 is a perspective of the exhaust controlling valve.

Figure 1:
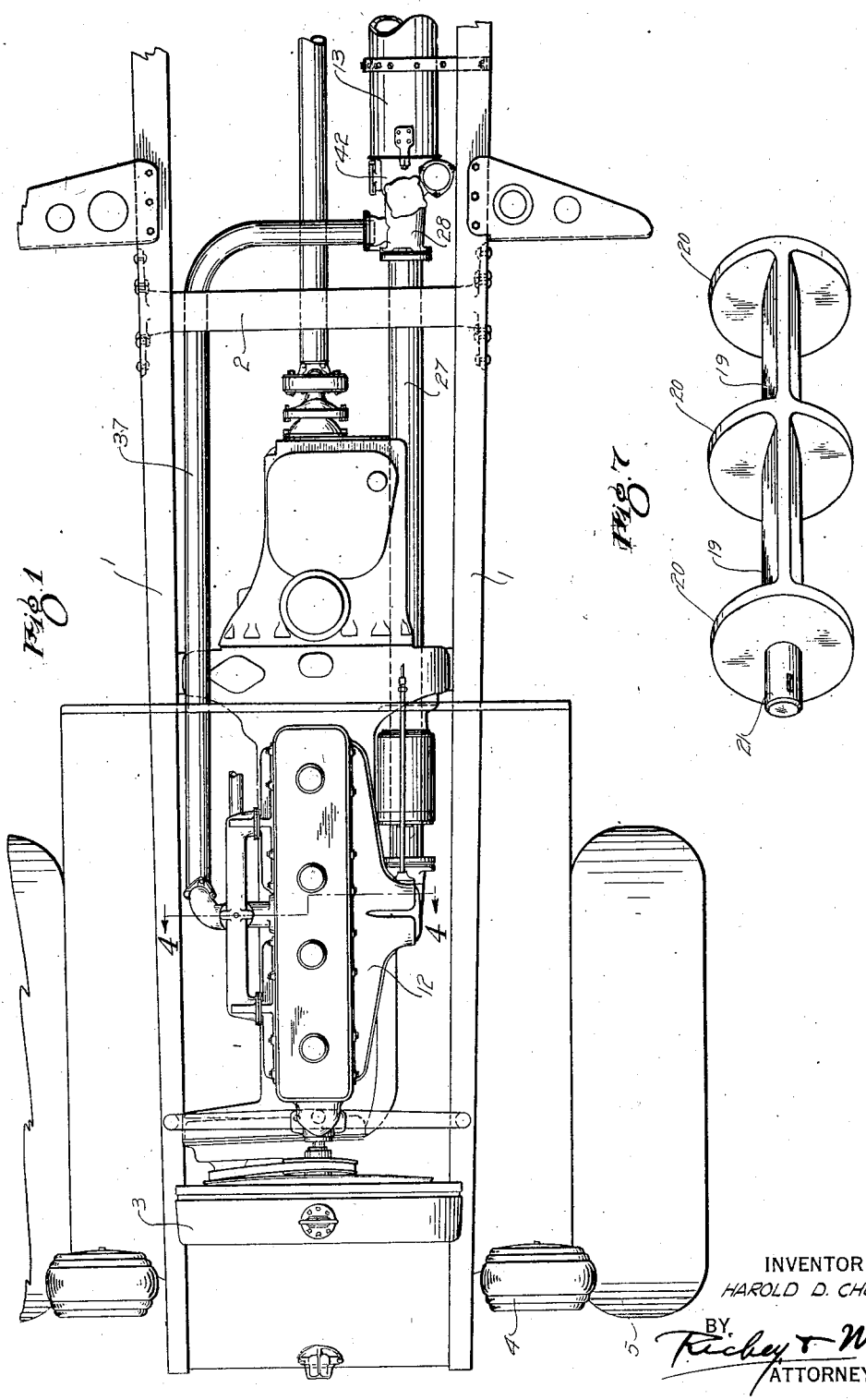
Figure 2:
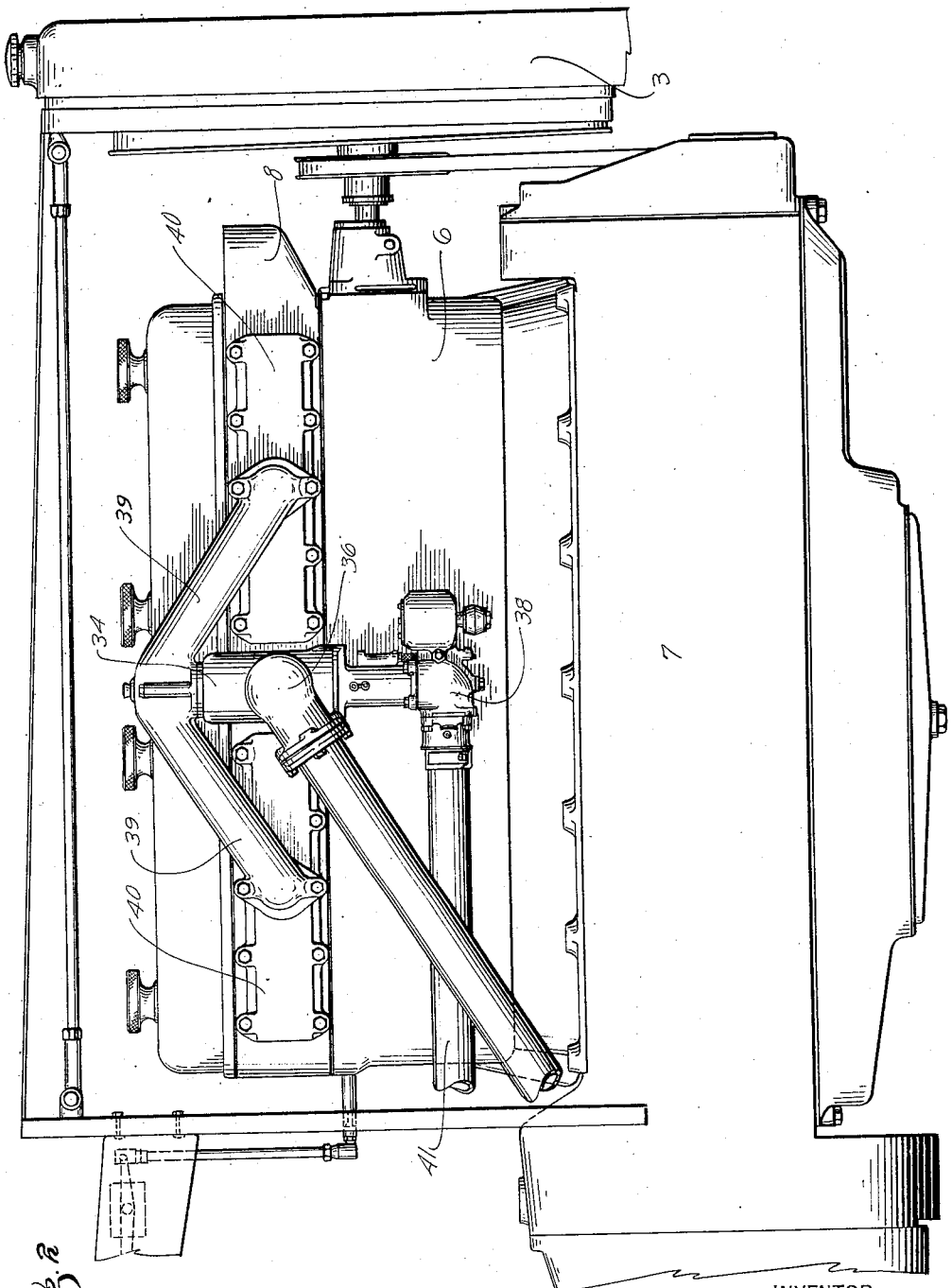
Fig. 2 is an elevation of the forward part of the vehicle shown in Fig. 1 taken from the righthand side thereof and on a larger scale.

As shown in Fig. 1 the automobile consists of a frame composed of side members 1 and cross members 2 connected by any suitable means, as by rivets. At the forward end of the frame are carried the usual radiator 3, lamps 4, and mud guards 5, and immediately behind the radiator is carried the motor by which the vehicle is propelled.

The motor is shown as including the cylinder block 6, a crank case 7, and a detachable cylinder head 8. The motor is illustrated as being of the six cylinder type, the cylinders of which are arranged in tandem groups of three, and above each cylinder the cylinder head is provided with intake ports 10 and exhaust ports 11. The intake ports all communicate with the righthand side of the motor and the exhaust ports all communicate with the lefthand side thereof. The structure thus far described is quite conventional and well known. It is also well known that the heat from the exhaust gases may be utilized to heat the air being conducted to the motor carburetor and thus improve the vaporization and consequently the combustion of the fuel, increasing the efficiency of the motor as well as grealy facilitating starting of the same.

Prior devices for so heating the intake air have been attended with certain disadvantages. Either a small quantity only of the exhaust gas was used for this purpose and the heating was therefore slow and inefficient, or if a large quantity was used, the amount of heat delivered could not be so regulated as to at all times maintain the motor at its maximum efficiency. Moreover, the heat transferring elements restricted the passage of the exhaust gases and built up undesirable back pressure which reduced the power of the motor. This power was further reduced by surging of these exhaust gases in the exhaust manifold itself, the tendency to surge being increased by the back pressure from the heat transfer device and the surging itself increasing the back pressure and loss of power.

I have discovered that the disadvantages attendant to prior types of motors may be eliminated and the entire volume or any part thereof of the exhaust gases used to heat the incoming fuel mixture, while the back pressure not only is not increased but is actually reduced and the power of the motor thus augmented instead of diminished.

The exhaust from the forward and rearward groups of cylinders is received in the forward and rearward chambers A and B of a manifold 12, from which chambers it may be selectively delivered directly to a muffler 13 or may be by-passed about the incoming fuel mixture by apparatus to be hereinafter described.

The chambers A and B each have two outlets, one consisting of an elbow-shaped extension 14 of the chamber and the other of an aperture 15 communicating with a passage through the cylinder head. The chambers are separated from each other by two walls 16 which are joined at their inner ends where they abut the cylinder head, this being the only direct connection between the two halves of the exhaust manifold. By forming the manifold in two nearly separated halves with spaced walls between the chambers, ample allowance is made for expansion due to the high temperatures attained in operation, and other causes, while the manufacture and assembling of these manifolds is much simpler than would be the case if it were composed of two entirely separate halves. This also permits the use of rigidly or integrally connected valves in the extensions 14, it being possible to accurately aline openings formed in the walls of both extensions.

The outer surface of the exhaust manifold may be provided with ribs 17 which increase the surface thereof and aid in the dissipation of heat therefrom. Within the chambers A and B and adjacent the openings 15 are deflectors or baffles 18 which, together with the outer wall of the manifold, which flares towards the center of the cylinder head block, deflect the exhaust gases out through openings 14 so that these gases will pass through openings 15 only when elbows 14 are obstructed.

Figure 3:
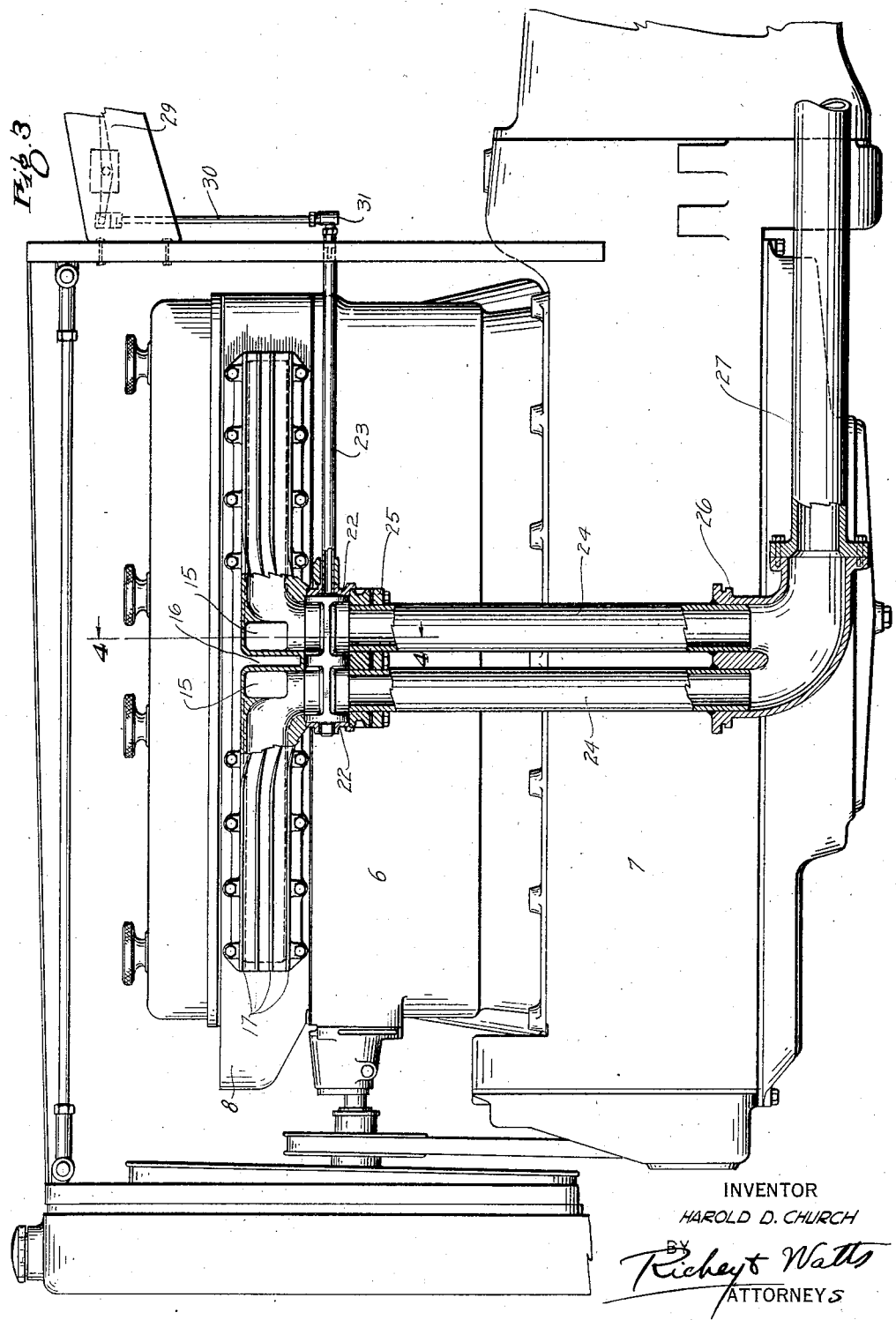
Fig. 3 is a view similar to Fig. 2 but taken from the lefthand side of Fig. 1.
Figure 4:
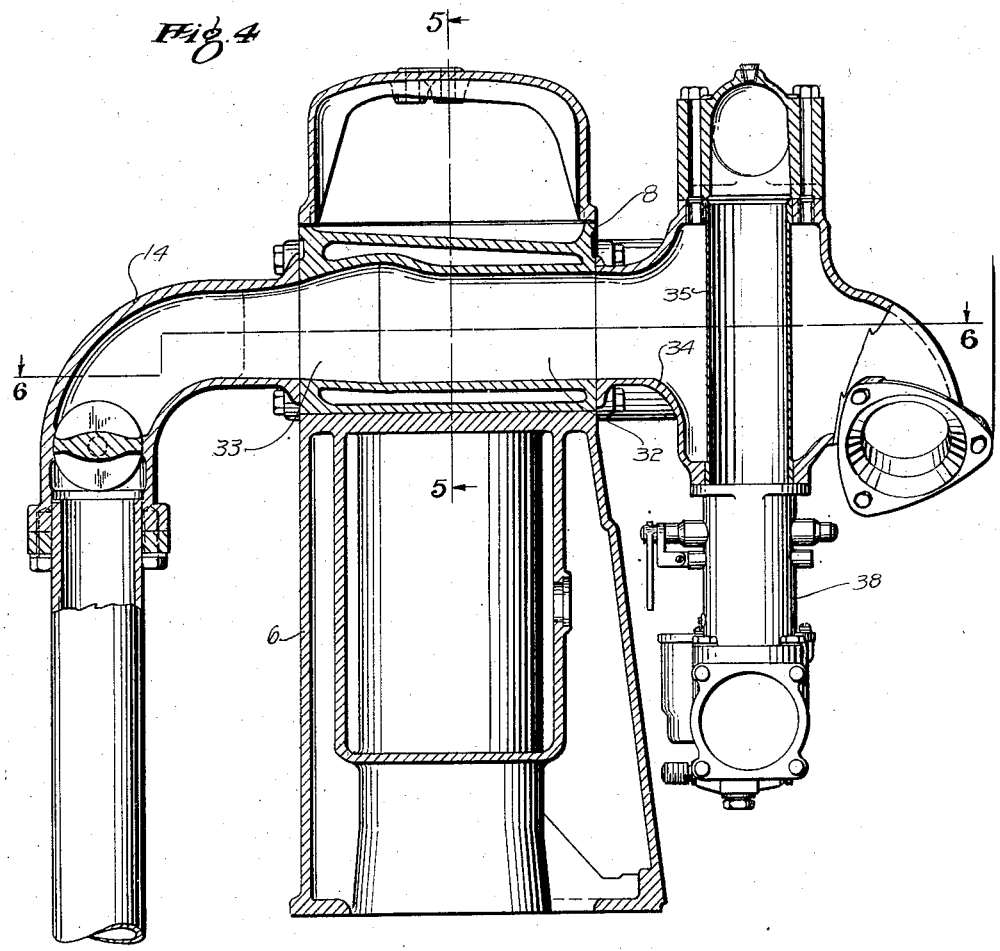
Fig. 4 is a transverse section of the motor illustrated in Figs. 1 to 3 taken on line 4—4 of Fig. 3.
Figure 5:
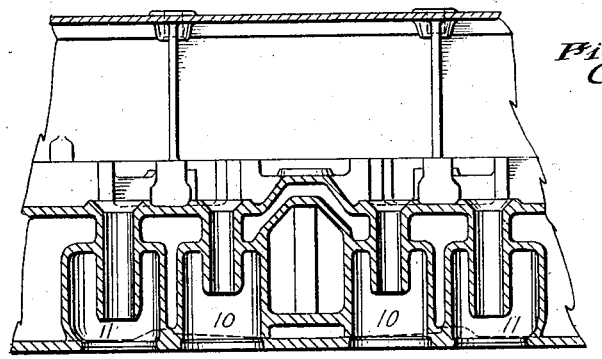
Fig. 5 is a fragmentary longitudinal section of the cylinder head, block, and associated parts taken on line 5—5 of Fig. 4.

In the lower end of elbows 14 is a longitudinally extending bore in which is fitted a valve which controls the discharge of the exhaust gases. This valve is best shown in Fig. 7 and consists of two substantially flat, but cross-sectionally somewhat lenticular, vanes or gates 19, having formed integrally therewith, between them and at their ends, discs 20 which fit within the bore openings with only sufficient clearance to permit the rotation of the valve and so act as trunnions partially supporting the valve. The outer sides of the end discs 20 are provided with integral cylindrical projections 21 by which the valve is partially supported in bearings carried by caps 22 which holds the outer end of the openings receiving the end discs. The rearward projection 21 has a shaft 23 splined to it, by which the valve may be rotated. As illustrated in Fig. 3, the valve is mainly supported by projections 21 acting as trunnions carried in bearings with caps 22 and the entire edges of discs 20 are sealed within the openings to prevent the escape of any gases through the valves to the outer air. The vanes are thickened or arched as shown for two reasons; first, that they are thus rendered strong and will not warp or bend even when exposed to the intense heat experienced so near the exhaust valves of the motor, and, second, by being so shaped they are approximately streamlined and present a minimum amount of resistance to the passage of the exhaust gases.

The lower ends of elbows 14 below the valves described are connected to tubes 24 by means of bolted flanges 25 or any other suitable means. These tubes extend downwardly nearly to the bottom of the motor where they are connected to an elbow-shaped manifold 26 communicating with a pipe 27 by which the exhaust gases are carried to a second manifold 28, communicating with the muffler 13. By conducting gases into manifold 26 through parallel pipes 24, there is no tendency for them to surge from one end of the exhaust manifold to the other, but on the contrary, the gases reaching manifold 26 with considerable velocity, produce therein an action somewhat similar to that of an ejector, so that the gases coming down one pipe 24, instead of building up a back pressure in the other pipe 24 and the other chamber of the exhaust manifold, tend to withdraw gases from this pipe and chamber and produce a partial vacuum which, instead of interfering with the exhaust from this chamber and pipe, facilitates the same and increases the power of the motor.

The exhaust-controlling valve is operated by the operator through a lever 29, rod 30 and crank arm 31 to restrict the opening in outlets 14 and cause any desired quantity of the exhaust gases to pass around deflectors 18 and out through openings 15. From these openings the gases pass through a Venturi shaped passage 32 formed centrally and transversely of the cylinder head casting. The casting has a partition 33 extending part away therealong and forming an extension of the walls 16, so that the gases from either chamber A or B are flowing to the right of the motor upon passing the point of conjunction with gases from the other chamber. This introduction of the exhaust gases in parallel streams and at high velocity produces the same ejector-like action as does that at the juncture of the pipes 24 and in a like manner not only prevents but reduces back pressure within the exhaust manifolds. The gases emerge from the tunnel or passage 32 into a compartment 34 which surrounds an upwardly extending pipe or tube 35. The compartment expands or widens as it approaches the tube and also increases very materially in height so that its cross sectional area at the widest part of the tube 35 is no less than the cross section area of tunnel 32 and the flow of the gases is therefore not restricted by passing through the compartment.

The upwardly extending tube 35 being circular in cross section, is sufficiently stream lined in shape to allow the gases to pass therearound practically unimpeded. The chamber 34 discharges through an elbow-like outlet 36 into a pipe 37 which in turn discharges into the manifold 28, above described, and thence into the muffler 13.

Fuel and air being drawn from the carburetor 38 to the cylinders of the motor pass upwardly through the tube 35 and so are heated to properly vaporize the fuel and insure efficient combustion thereof. As illustrated in the drawings, the carburetor 38 is carried by the lower part of compartment 34 and opens directly into the bottom of tube 35. The upper end of the tube 35 opens into the juncture of two downwardly divergent tubes 39 which discharge in turn into manifolds 40, each of which communicate with the intake opening of one group of cylinders. These manifolds may conveniently be made in the form of covers or plates, as illustrated, but, of course, the fuel mixture may be distributed from the heat exchanging tube in any desired manner.

The carburetor 38 is shown as provided with a pipe 41 through which air is supplied thereto from a suitable air strainer or filter as shown.

The manifold 28 is provided with flanged openings 42 which are shown as capped, but may be so connected as to allow the exhaust gases to circulate through heaters or the like within the vehicle or to operate other accessories.

While I have described the illustrated embodiment of my invention with some particularity, obviously many variations and modifications thereof will readily occur to those skilled in the art to which is appertains, and I, therefore, do not limit myself to the precise details shown and described but claim as my invention all embodiments coming within the scope of the subjoined claims.

1. A multi-cylinder internal combustion motor having a plurality of chambers for receiving exhaust gases from the cylinders, two outlets from each chamber, one of which communicates directly with a manifold, and the other of which discharges the gases into a passage through the motor, the first mentioned outlets all discharging into the manifold in the same direction and toward the outlet thereof, and the passages through the motor extending in susbtantially the same direction and merging within the motor and valves for simultaneous operation in each of said first mentioned passages.

2. An internal combustion engine having an exhaust manifold with two outlets, one of the outlets being arranged so that substantially all the exhaust gases will normally pass therethrough, due to their velocity and the stream line shape of the manifold, a conduit connecting said outlet to an exhaust discharge pipe, a valve in the first mentioned outlet for obstructing the passage of exhaust gases therethrough to direct them through the second mentioned outlet, a passage from the second mentioned outlet through the motor and discharging into a chamber, a tube extending through the chamber and through which the fuel mixture is delivered to the motor, and a conduit extending from the chamber to the exhaust discharge pipe.

3. A multi-cylinder internal combustion engine having two exhaust chambers each being provided with two outlets, the exhaust gases from one outlet of each chamber being conducted in susbtantially the same direction to a common manifold where they discharge at high velocity and in the same direction, the other two outlets opening into passages through the motor which merge therein at a point where the exhaust gases are traveling in substantially the same direction and at high velocity, valves for restricting the first two outlets, the opening through the motor communicating with a chamber through which passes a tube conveying the fuel mixture to the motor, the cross sectional area of the chamber at the sides of the tube being as great as that of the passage through the motor, whereby the gases are not substantially restricted in their flow.

4. A multi-cylinder internal combustion engine having two exhaust chambers each being provided with two outlets, the exhaust gases from one outlet of each chamber being conducted in substantially the same direction to a common manifold where they discharge at high velocity and in the same direction, the other two outlets opening into passages through the motor which merge therein at a point where the exhaust gases are traveling in substantially the same direction and at high velocity, valves for restricting the first two outlets, the opening through the motor communicating with a chamber through which passes a tube conveying the fuel mixture to the motor, the cross sectional area of the chamber at the sides of the tube being as great as that of the passage through the motor, whereby the gases are not substantially restricted in their flow, and a conduit from said chamber to the exhaust discharge pipe.

5. A multi-cylinder internal combustion engine having two exhaust chambers each being provided with two outlets, the exhaust gases from one outlet of each chamber being conducted in substantially the same direction to a common manifold where they discharge at high velocity and in the same direction, the other two outlets opening into passages through the motor which merge therein at a point where the exhaust gases are traveling in substantially the same direction and at high velocity, valves for restricting the first two outlets, the opening through the motor communicating with a chamber through which passes a tube conveying the fuel mixture to the motor, the cross sectional area of the chamber at the sides of the tube being as great as that of the passage through the motor, whereby the gases are not substantially restricted in their flow, and baffles in the exhaust chambers directing the flow of gases toward the first mentioned outlets.

6. A multi-cylinder internal combustion engine having two exhaust chambers each being provided with two outlets, the exhaust gases from one outlet of each chamber being conducted in substantially the same direction to a common manifold where they discharge at high velocity and in the same direction, the other two outlets opening into passages through the motor which merge therein at a point where the exhaust gases are traveling in substantially the same direction and at high velocity and valves for restricting the first two outlets.

7. A six cylinder internal combustion engine, having two exhaust chambers, one receiving the exhaust gases from the forward three cylinders and the other from the rearward three cylinders, a common exhaust line, and a single convergent member into which the exhaust gases from the two conduits are directed and simultaneously turned into the exhaust line.

8. An internal combustion engine having a plurality of cylinders, a separable exhaust manifold therefor having a plurality of chambers, a single compartment for receiving gases from said chambers and conduits connecting said chambers with said compartment.

9. A six cylinder internal combustion engine having an exhaust manifold embodying two chambers each receiving the gases from three of the cylinders, two substantially parallel conduits, one leading from each chamber and both discharging into a single compartment at adjacent points in substantially the same direction.

10. A six cylinder internal combustion engine having a separable exhaust manifold comprising two chambers, one receiving the exhaust gases from the forward three cylinders and the other from the rearward three cylinders, a common exhaust line, a second exhaust line, and means for selectively directing the exhaust gases from the two chambers into the second exhaust line in substantially the same direction.

11. An exhaust manifold comprising two channels oppositely directed towards a central deflector, parallel conduits leading away from the opposite sides of said deflector, a second deflector common to both parallel conduits, and having a deflecting wall directing the stream of one conduit, and an opening for the other conduit opposite said deflecting wall.

12. An exhaust manifold comprising two channels oppositely directed towards a central deflector, parallel conduits leading away from the opposite sides of said deflector, a second deflector common to both parallel conduits, and having a deflecting wall directing the stream of one conduit, and an opening for the other conduit opposite said deflecting wall, whereby the stream from the second conduit is deflected by the stream from the first while the stream from the first is still undergoing deflection.

13. An exhaust manifold including two substantially coaxial passages directed to a common separating plate, parallel conduits leading away from the opposite sides of said plate, an elbow manifold into which said conduits are connected, a single exhaust pipe leading away from said manifold, conduit connections in said manifold arranged one behind the other in the direction of the exhaust pipe, the second such connection constituting a suction nozzle operated by the gas from the first.

In testimony whereof I hereunto affix my signature this 28th day of February, 1927.

HAROLD D. CHURCH.